United States Patent [19]
Fröhlich et al.

[11] Patent Number: 6,003,384
[45] Date of Patent: Dec. 21, 1999

[54] VORTEX FLOW SENSOR WITH A CAPACITIVE SENSING ELEMENT

[75] Inventors: Thomas Fröhlich, Basel, Switzerland; Roger Kerrom, Lörrach, Germany

[73] Assignee: Endress +Hauser Flowtec AG, Reinach, Switzerland

[21] Appl. No.: 08/953,229

[22] Filed: Oct. 17, 1997

Related U.S. Application Data

[60] Provisional application No. 60/030,465, Nov. 13, 1996.

[30] Foreign Application Priority Data

Nov. 8, 1996 [EP] European Pat. Off. .............. 96117892
Oct. 7, 1997 [EP] European Pat. Off. .............. 97810765

[51] Int. Cl.⁶ ....................................................... G01F 1/32
[52] U.S. Cl. ...................................... 73/861.22; 73/861.24
[58] Field of Search ........................... 73/861.22, 861.24, 73/861.23

[56] References Cited

U.S. PATENT DOCUMENTS

| 4,716,770 | 1/1988 | Herzog . |
| 5,347,873 | 9/1994 | Vander Heyden . |

FOREIGN PATENT DOCUMENTS

| 0 240 100 A1 | 10/1987 | European Pat. Off. . |
| 0 549 945 A2 | 7/1993 | European Pat. Off. . |
| 35 44 198 A1 | 6/1987 | Germany . |
| 41 43 202 C1 | 2/1993 | Germany . |
| 57-189015 | 11/1982 | Japan . |
| 1 483 818 | 8/1977 | United Kingdom . |
| WO 94/08211 | 4/1994 | WIPO . |

*Primary Examiner*—Harshad Patel
*Attorney, Agent, or Firm*—Bose McKinney & Evans LLP

[57] ABSTRACT

This vortex flow sensor is to be designed either as vortex sensor with a capacitive vortex sensing element (3, 3') either arranged in the hole of a bluff body (4) or inserted into a wall opening of a measuring tube (2, 2') downstream of the bluff body. Both vortex sensing elements being of largely identical construction and being capable of being produced as an independent component in the manner of a module. The wall sensor (3) and the bluff body sensor (3') has a diaphragm (33, 33') sealing off the hole and the wall opening. A flexurally stiff thin sensor vane (31) or sensor sleeve (51) and a sleeve-shaped electrode arrangement (34, 34') with at least one electrode (341, 341') are attached to the diaphragm on opposite sides. A housing cap (32, 32') surrounds the electrode arrangement and the diaphragm, is fixed on the measuring tube and contains a second electrode arrangement (35, 35') with at least one counter-electrode (351, 352; 351', 352'). The mass of the sensor sleeve is made equal to the mass of the electrode arrangement (34, 34'). The geometrical moment of inertia of the sensor sleeve is made equal to that of the electrode arrangement (34, 34'). The housing cap is dimensioned to be of sufficient flexural stiffness to ensure that it does not bend in the case of a maximum permissible acceleration acting on the measuring tube.

2 Claims, 4 Drawing Sheets

VORTEX FLOW SENSOR WITH A CAPACITIVE SENSING ELEMENT

This application claims benefit of Provisional Appl. Ser. No. 60/030,465, filed Nov. 13, 1996.

FIELD OF THE INVENTION

The invention relates to a vortex flow sensor for measuring the flow velocity or volume flow rate of a fluid flowing in one direction of flow in a measuring tube, having a bluff body which is arranged across a diameter of the measuring tube and serves to generate Kármán vortices.

BACKGROUND OF THE INVENTION

During the operation of a vortex flow sensor of this kind, a Kármán vortex street is, as is known, formed downstream of the bluff body, and the pressure fluctuations of this street are converted by a vortex sensing element into an electrical signal, the frequency of which is proportional to the volume flow rate.

GB Patent 1,483,818 describes a vortex flow sensor for measuring the flow velocity or volume flow rate of a fluid flowing in one direction of flow in a measuring tube
- with a bluff body which is arranged along a diameter of the measuring tube and serves to generate Kármán vortices and
- with a vortex sensing element which responds to pressure fluctuations generated by the vortices, is inserted into a wall opening of the measuring tube downstream of the bluff body, sealing off this opening relative to the circumferential surface of said measuring tube, and is shorter than the diameter.

U.S. Pat. No. 4,716,770 describes a vortex flow sensor for measuring the flow velocity and/or volume flow rate of a fluid flowing in one direction of flow in a measuring tube
- with a bluff body which is arranged along a diameter of the measuring tube, is connected at each end to the measuring tube, serves to generate Kármán vortices and has a main hole, running in the direction of this diameter and through the measuring tube, and at least one secondary hole, which connects the main hole to the fluid,
- with a capacitive vortex sensing element which responds to pressure fluctuations generated by the vortices, is inserted into the main hole, sealing off the latter from the fluid, and has the following features:
  - a flexible outer sensor sleeve which is closed at the ends and serves as a first electrode, and
  - a flexible inner sensor sleeve which is arranged therein and carries at least one second electrode at the end.

The disclosure in U.S. Pat. No. 4,716,770 is hereby incorporated by reference and made part of the specification in this application.

Finally, EP-A 549 945 describes a vortex flow sensor for measuring the flow velocity and/or volume flow rate of a fluid flowing in one direction of flow in a measuring tube
- with a vortex sensing element which is inserted into a wall opening of the measuring tube, sealing off this opening relative to the circumferential surface of said measuring tube, and has the following features:
  - a bearing which is thinned to a diaphragm in the area of the opening, covers the opening and has a first surface facing toward the fluid and a second surface facing away from the fluid,
  - a first end of a flexurally stiff beam is attached to the first surface of the diaphragm,
  - a second end of the beam is attached to the second surface of the diaphragm,
  - a sensor element sensing movements of the second end of the beam is attached to a housing and cooperates with the second end,
  - the ends are so dimensioned that they perform opposite and equal torsional moments to the diaphragm.

As the GB Patent 1,483,818 and the U.S. Pat. No. 4,716,770 both referred to indicate, the vortex sensing element can be arranged either in the bluff body or, separately from the latter, in the opening in the wall of the measuring tube. With regard to cost reduction in the production of the vortex flow sensor, on the one hand, and with regard to the standardization of the components of the latter, on the other hand, a vortex sensing element which can be inserted not only into the bluff body (as in U.S. Pat. No. 4,716,770) but also into the wall of the measuring tube (as in GB Patent 1,483,818) is desirable.

SUMMARY OF THE INVENTION

One object underlying the invention is therefore to specify a vortex flow sensor with a vortex sensor arranged within the bluff body and a vortex flow sensor with a vortex sensing element which is fixed in the wall of the measuring tube, the respective vortex sensing elements being of largely identical construction and being capable of being produced as an independent component in the manner of a module.

For this purpose, a first variant of the invention consists in a vortex flow sensor for measuring the flow velocity and/or the volume flow rate of a fluid flowing in one direction of flow in a measuring tube
- with a bluff body which is arranged along a diameter of the measuring tube, is connected to the measuring tube at at least one fixing location and serves to generate Kármán vortices,
- with a capacitive vortex sensing element which responds to pressure fluctuations generated by the vortices, is inserted into a wall opening in the measuring tube downstream of the bluff body, sealing off this hole relative to the circumferential surface of said measuring tube, and the center of which lies, together with the center of the fixing location, on a generatrix of the measuring tube, and has the following features:
  - a diaphragm which covers the opening and which has a first surface facing toward the fluid and a second surface facing away from the fluid,
  - a flexurally stiff thin sensor vane is attached to the first surface of the diaphragm and is shorter than the diameter, having flat main surfaces which are in alignment with the generatrix of the measuring tube,
  - a sleeve-shaped first electrode arrangement is attached to the second surface of the diaphragm and comprises at least one electrode,
  - a housing cap which surrounds the first electrode arrangement and the diaphragm, is fixed on the measuring tube and contains a second electrode arrangement with at least one counterelectrode,
  - the mass of the sensor vane is made greater than the mass of the first electrode arrangement,
  - the geometrical moment of inertia of the sensor vane at the first surface of the diaphragm is made approximately equal to the geometrical moment of inertia of the first electrode arrangement at the second surface of the diaphragm, and
  - the housing cap is dimensioned to be of sufficient flexural stiffness to ensure that it does not bend in the case of a maximum permissible acceleration acting on the measuring tube.

To achieve said object, a second variant of the invention consists in a vortex flow sensor for measuring the flow velocity and/or the volume flow rate of a fluid flowing in one direction of flow in a measuring tube with a bluff body which is arranged along a diameter of the measuring tube, is connected to the measuring tube at at least one fixing location, serves to generate Kármán vortices and has a main hole, running in the direction of this diameter and through the measuring tube, and at least one secondary hole, which connects the main hole to the fluid, with a capacitive vortex sensing element which responds to pressure fluctuations generated by the vortices, is inserted into the main hole, sealing off the circumferential surface of the measuring tube from the fluid, and has the following features:

a diaphragm which covers a measuring-tube end of the main hole and which has a first surface facing toward the fluid and a second surface facing away from the fluid, a flexurally stiff sensor sleeve is attached to the first surface of the diaphragm, a sleeve-shaped first electrode arrangement is attached to the second surface of the diaphragm and comprises at least one electrode, a housing cap which surrounds the first electrode arrangement and the diaphragm, is fixed on the measuring tube and contains a second electrode arrangement with at least one counterelectrode, the mass of the sensor sleeve is made equal to the mass of the first electrode arrangement, the geometrical moment of inertia of the sensor sleeve at the first surface of the diaphragm is made approximately equal to the geometrical moment of inertia of the first electrode arrangement at the second surface of the diaphragm, and the housing cap is dimensioned to be of sufficient flexural stiffness to ensure that it does not bend in the case of a maximum permissible acceleration acting on the measuring tube.

An advantage of the invention consists in that the vortex sensor is largely insensitive against vibrations exerting from outside.

BRIEF DESCRIPTION OF THE DRAWINGS

The invention and further advantages will now be explained in greater detail with reference to preferred/exemplary embodiments, which are illustrated in the figures of the drawing. Identical parts in different figures are denoted by the same reference numerals but are omitted when clarity requires it.

In the drawings.

DETAILED DESCRIPTION OF THE DRAWINGS

Figure 1:
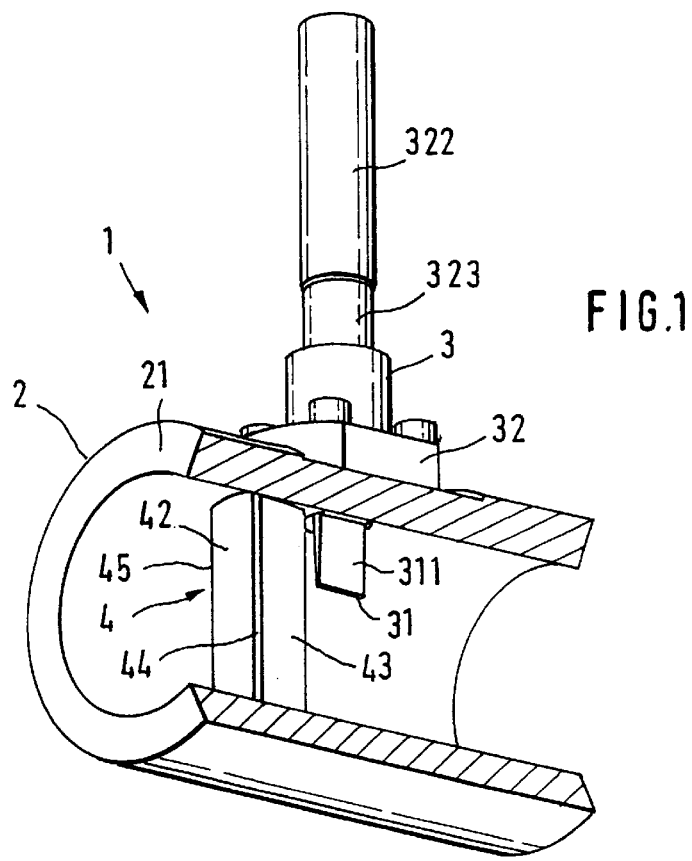
FIG. 1 is a partially sectioned and perspective view, in the direction of flow, of a vortex flow sensor with a vortex sensing element fixed in the wall of the measuring tube according to the first variant of the invention.
Figure 2:
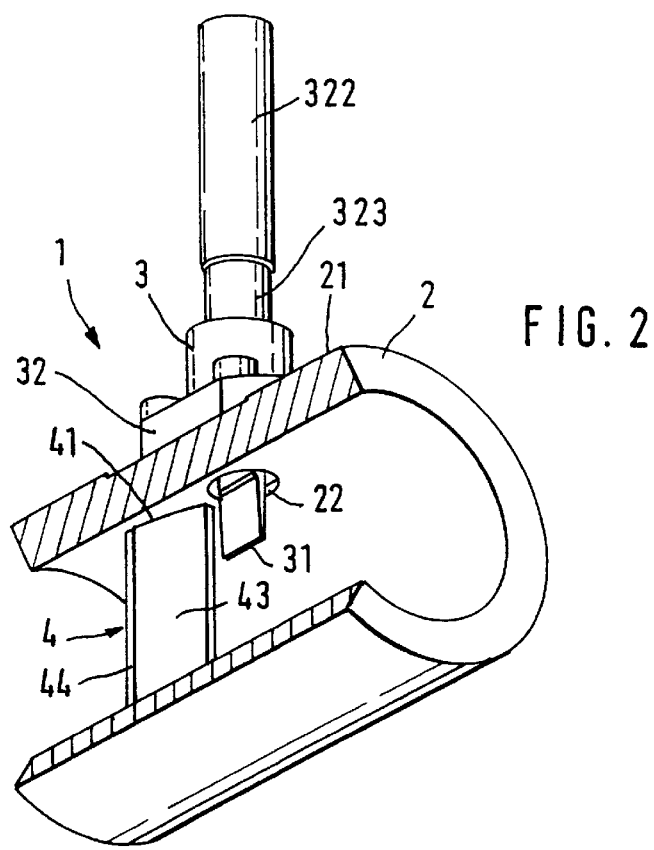
FIG. 2 is a partially sectioned and perspective view, in the direction of opposite flow, of the vortex flow sensor according to FIG. 1.

The perspective views illustrated in FIGS. 1 and 2, which serve to provide an overall view, show, on the one hand in the direction of flow and on the other hand opposite the direction of flow, a partially sectioned vortex flow sensor 1 with a capacitive vortex sensing element 3 fixed in and on a wall 21 of a measuring tube 2.

Figure 3:
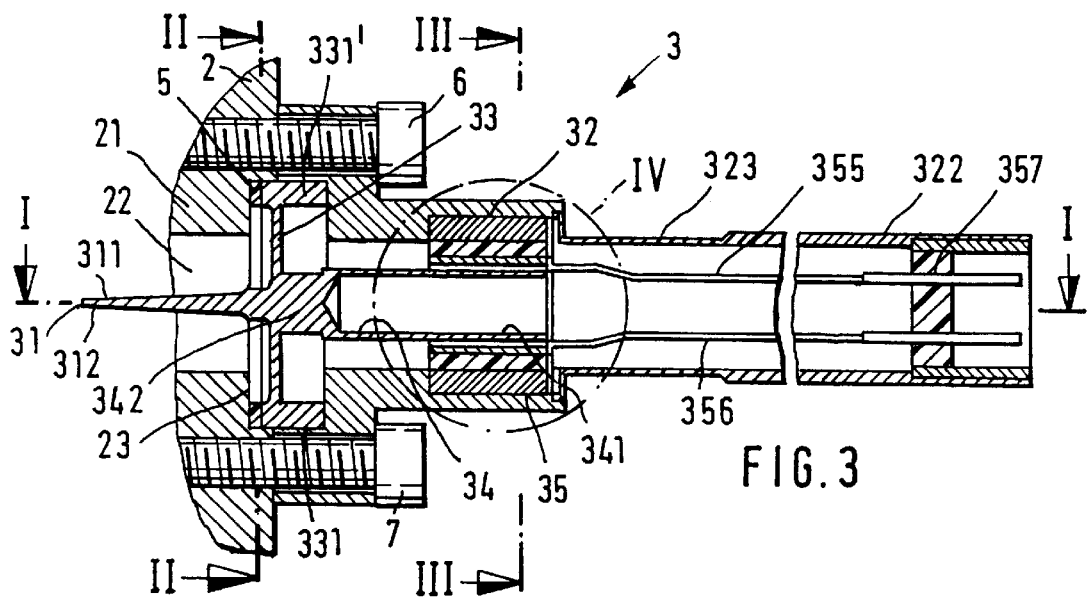
FIG. 3 is a longitudinal sectioned view of a vortex sensing element to be fixed in the wall of the measuring tube according to FIGS. 1 and 2.
Figure 4:
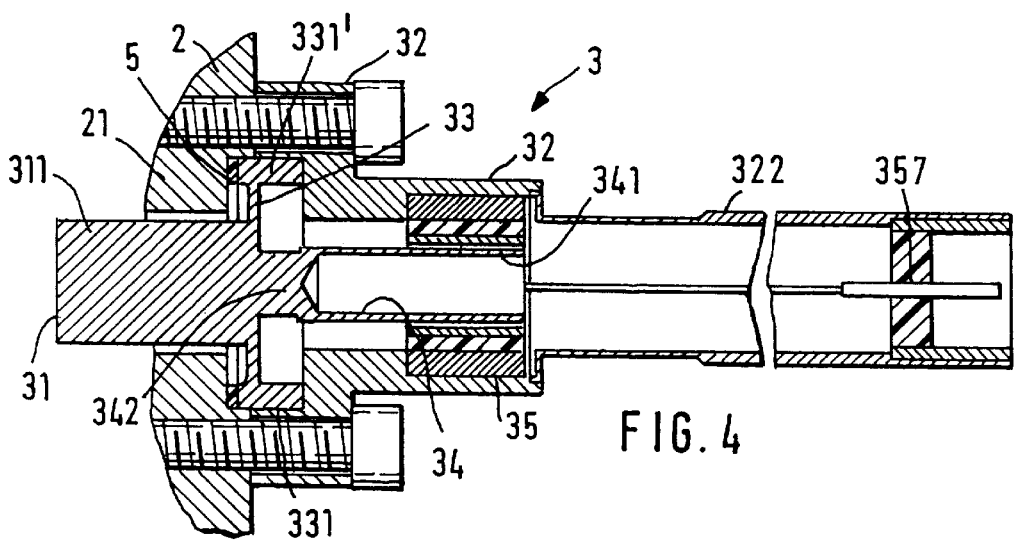
FIG. 4 is a longitudinal sectioned view of the vortex sensing element shown in FIG. 3, sectioned in the latter along the line I—I and shown in the direction of the corresponding arrows.

A thin, flexurally stiff sensor vane 31 which has two flat main surfaces and a housing cap 32 and projects into the interior of the measuring tube 2 through an opening 22 in the wall 21 is all that can be seen of the vortex sensing element 3 in FIGS. 1 and 2; of the two main surfaces, FIG. 1 shows only the main surface 311—as does FIG. 4—while FIG. 3 shows a respective line of intersection across the main surfaces 311, 312. The housing cap ends in an extension 322, the respective details of which are explained below, with the interposition of a thinner-walled intermediate piece 323.

Arranged along a diameter of the measuring tube 2, in the interior of the latter, is a bluff body 4, which is rigidly connected to the measuring tube 2, forming a first fixing location 41, which is illustrated, and a second fixing location, which is concealed. It is also possible to dispense with one of the fixing locations. The center of the opening 22 and the center of the fixing location 41 lie on a generatrix of the measuring tube.

The bluff body 4 has an impact surface 42, against which, in operation, a fluid to be measured, e.g. a liquid, a gas or a vapour, flows, and two lateral surfaces, of which only one (front) lateral surface 43 can be seen in FIGS. 1 and 2. Two separation edges are formed by the impact surface 42 and the lateral surfaces, only one (front) separation edge 44 of these being completely visible and one (rear) separation edge 45 being shown in an indicative manner in FIG. 1.

The flow of the fluid against the impact surface 42 leads to the formation, downstream of the bluff body 4, of a Kármán vortex street in the fluid due to the fact that vortices separate alternately at each separation edge and are carried along by the flowing fluid. As illustrated, the separation edges 44, 45 can be slightly rounded in order to improve the separation of the vortices.

These vortices generate local pressure fluctuations in the fluid, these being converted into electrical signals by means of the vortex sensing element 3 and their separation frequency, i.e. what is referred to as their vortex frequency, being a measure of the volume flow rate and/or the flow velocity of the fluid.

The shape and cross-section of the bluff body 4 in FIGS. 1 and 2 are essentially those of a straight triangular column, i.e. a column with a triangular cross-section. However, other conventional shapes of the bluff body can also be employed in the invention.

Figure 5:
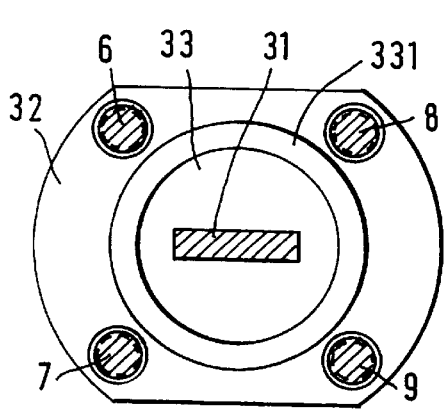
FIG. 5 is a first cross-section of the vortex sensing element shown in FIG. 3, sectioned in the latter along the line II—II and shown in the direction of the corresponding arrows.
Figure 6:
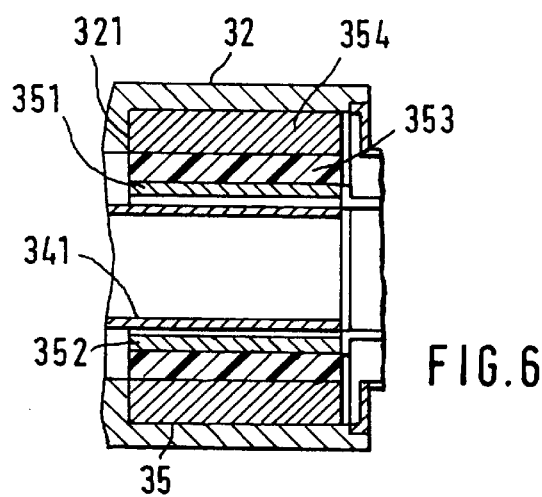
FIG. 6 is a longitudinal sectioned view of the detail IV in FIG. 3, on a slightly enlarged scale in comparison with the latter.
Figure 7:
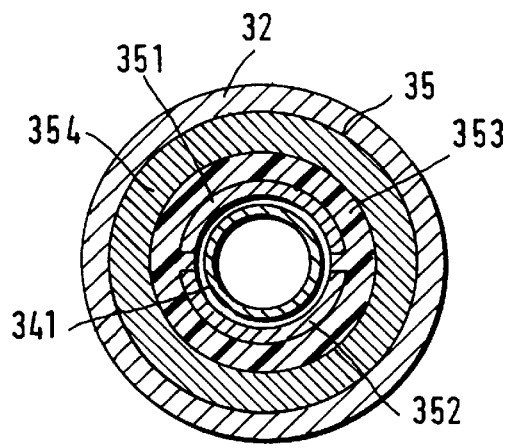
FIG. 7 is a second cross-section of the vortex sensing element shown in FIG. 3, sectioned in the latter along the line III—III and shown in the direction of the corresponding arrows.

Further details of the capacitive vortex sensing element 3 shown in FIGS. 1 and 2 are illustrated in FIGS. 3 to 7, in each case in the form of a sectional view. Thus, FIGS. 3 and 4 show the vortex sensing element in two longitudinal sections which are offset by 90° relative to one another; FIGS. 5 and 7 show two cross-sections and FIG. 6 shows a detail of the longitudinal section in FIG. 3 on a slightly enlarged scale.

In FIGS. 3 to 7, the capacitive vortex sensing element 3 has a diaphragm 33 which covers the opening 22 in the wall 21 of the measuring tube 2 and thus closes the opening 22 fluid-tightly, so that no fluid can reach the circumferential surface 21 of the measuring tube 2 even at a maximum permissible fluid pressure. The diaphragm 33 has a first surface facing toward the fluid and a second surface facing away from the fluid.

This is accomplished, for example, by means of an annular seal 5, which is inserted between a flat supporting surface 23 formed in the wall 21 from the outside, by milling for example, and an annular rim 331 of the diaphragm 33. The rim 331 is taller than the thickness of the diaphragm 33.

The sensor vane 31, which is shorter than the diameter of the measuring tube 2, is attached to the first surface of the diaphragm 33. The flat main surfaces 311, 312 are in alignment with the generatrix of the measuring tube 2 and, as indicated in FIGS. 1 and 2, can form a small wedge.

A sleeve-shaped first electrode arrangement 34, which comprises at least one electrode 341, is attached to the second surface of the diaphragm 33. At the point of transition from the first electrode arrangement 34 to the diaphragm 33 there is a solid transition piece 342 which is approximately as tall as the part 331' of the rim 331 of the diaphragm 33 facing away from the fluid and the diameter of which is approximately equal to the inside diameter of the sleeve of the first electrode arrangement 34.

The housing cap 32 surrounds the first electrode arrangement 34 and the diaphragm 33 and is attached to the measuring tube 2 by means, for example, of four screws 6, 7, 8, 9. The housing cap 32 contains a second electrode arrangement 35 with a first and a second counterelectrode 351, 352, each of which is of approximately semicircular design.

The second electrode arrangement 35 is preferably produced as a prefabricated part which, after its production, is fixed in a corresponding pocket hole 321 in the housing cap 32, e.g. by shrink-fitting, by means of a press fit or by welding.

The second electrode arrangement 35 comprises, as seen from the inside outwards, the two counterelectrodes 351, 352, an insulating-material ring 353 and a metal ring 354, which is seated in the pocket hole 321 in the housing cap 32.

A respective connecting line 355, 356 leads from each counterelectrode 351, 352 to a plug arrangement 357 which is arranged at the end of a tubular extension 322 of the housing cap 32 and via which the capacitors formed by the electrode 341 and the counterelectrodes 351, 352 can be connected to a measuring circuit (not shown).

The extension 322 is connected to the remaining parts of the housing cap 32 by a thinner-walled and, therefore, diaphragm-like intermediate piece 323, which ends just above the two electrode arrangements 34, 35. By means of the intermediate piece, deflections of the extension 322 caused, for example, by vibrations acting on its outside, are largely kept away from the electrode arrangements 34, 35.

In operation, the pressure fluctuations mentioned produce deflections of the sensor vane 31 in a direction perpendicular to its main surfaces 311, 312. These deflections are transmitted by the diaphragm 33 to the first electrode arrangement 34 in such a way that it moves either slightly downwards or upwards in the plane of the drawing of FIG. 3.

As a result, either the electrode 341 moves away from the counterelectrode 351 and simultaneously approaches the counterelectrode 352 or approaches the counterelectrode 351 and simultaneously moves away from the counterelectrode 352. However, these movements lead to changes in the capacitance of the two capacitors formed by the electrode 341 and the counterelectrode 351 and by the electrode 341 and the counterelectrode 352.

Figure 8:
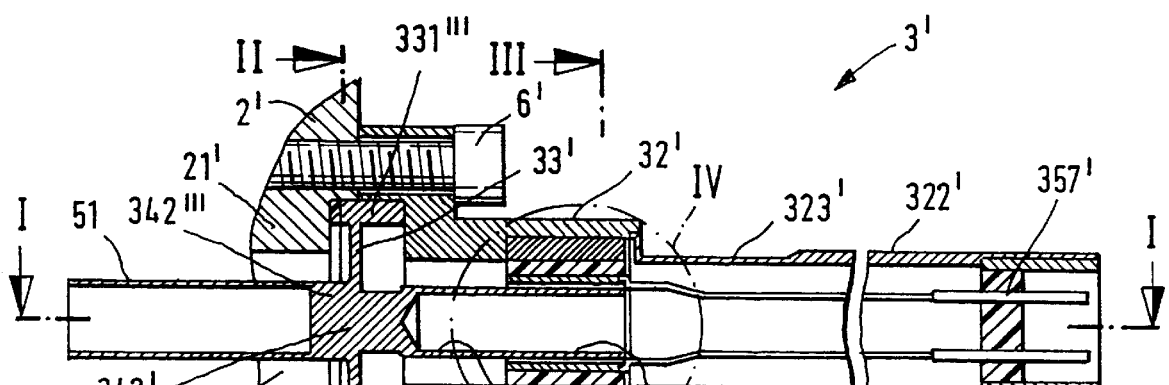
FIG. 8 is a longitudinal sectioned view of a vortex sensing element for insertion into the bluff body of the measuring tube, according the second variant of the invention.
Figure 9:
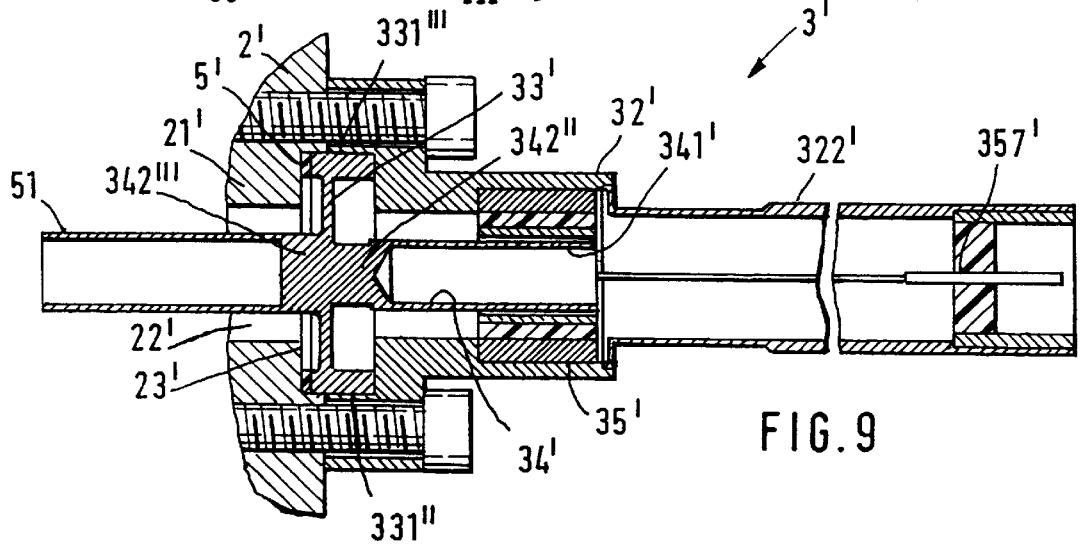
FIG. 9 shows a longitudinal section of the vortex sensing element shown in FIG. 8, sectioned in the latter along the line I—I and shown in the direction of the corresponding arrows.
Figure 10:
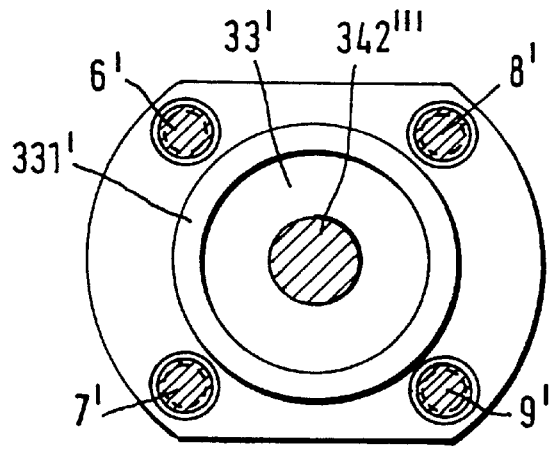
FIG. 10 is a first cross-section of the vortex sensing element shown in FIG. 8, sectioned in the latter along the line II—II and shown in the direction of the corresponding arrows.
Figure 11:
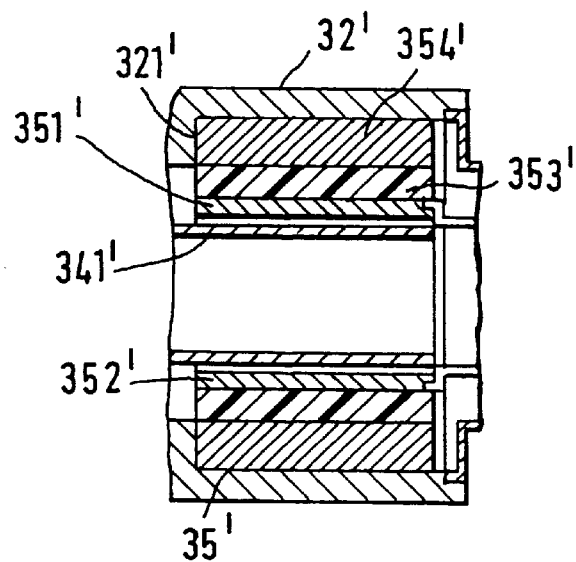
FIG. 11 shows a longitudinal section of the detail IV in FIG. 8, on a slightly enlarged scale in comparison with the latter.
Figure 12:
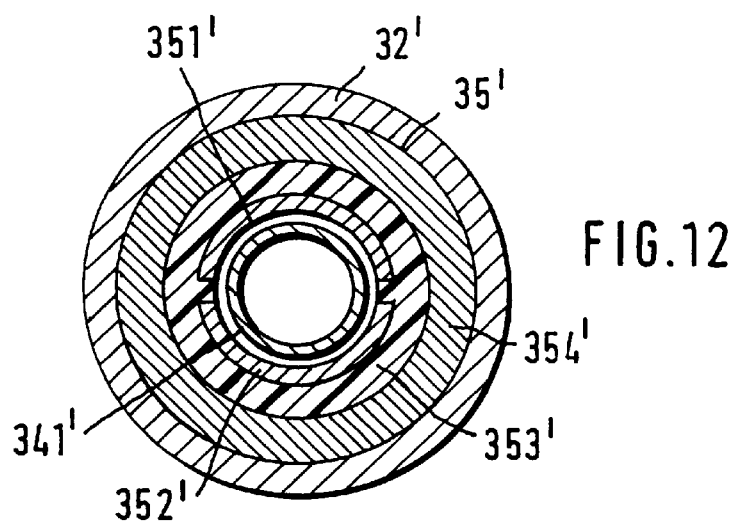
FIG. 12 shows a second cross-section of the vortex sensing element shown in FIG. 8, sectioned in the latter along the line III—III and shown in the direction of the corresponding arrows.

FIGS. 8 to 12 show a preferred embodiment of a vortex sensing element which can be inserted into the main hole, mentioned in the reference to U.S. Pat. No. 4,716,770, sectional illustrations being chosen in each case. Thus, FIGS. 8 and 9 show the vortex sensing element in two longitudinal sections which are offset by 90' relative to one another, FIGS. 10 and 12 show two cross-sections and FIG. 11 shows a detail of the longitudinal section of FIG. 8 on a slightly enlarged scale.

In FIGS. 8 to 12, the capacitive vortex sensing element 3' has a diaphragm 33' which covers the opening of the main hole in the bluff body and in the wall of the measuring tube 2' and thus closes the opening fluid-tightly, so that no fluid can reach the circumferential surface of the measuring tube 2' even at a maximum permissible fluid pressure.

This is accomplished, for example, by means of an annular seal 5', which is inserted between a flat supporting surface 23' formed in the wall 21' from the outside, by milling for example, and an annular rim 331" of the diaphragm 33'. The rim 331" is taller than the thickness of the diaphragm 33'.

A sensor sleeve 51, which projects into the main hole of the bluff body and is shorter than the diameter of the measuring tube 2', is attached to the diaphragm 33'.

A sleeve-shaped first electrode arrangement 34', which comprises at least one electrode 341', is attached to the second surface of the diaphragm 33'. At the point of transition from the first electrode arrangement 34' and the sensor sleeve 51 to the diaphragm 33' there is a solid transition piece 342'. That part 342" of it that faces the electrode arrangement 34' is approximately as tall as the part 331'" of the rim 331' of the diaphragm 33' facing away from the fluid. That part 342'" of the transition piece 342' that faces the sensor sleeve 51 is somewhat lower than the part 342" and the diameter of it is equal to the outside diameter of the sensor sleeve 51.

A housing cap 32' surrounds the first electrode arrangement 34' and the diaphragm 33' and is attached to the measuring tube 2'" by means, for example, of four screws 6', 7', 8', 9'. The housing cap 32' contains a second electrode arrangement 35' with a first and a second counterelectrode 351', 352', each of which is of approximately semicircular design.

The second electrode arrangement 35' is preferably produced as a prefabricated part which, after its production, is fixed in a corresponding pocket hole 321' in the housing cap 32', e.g. by shrink-fitting, by means of a press fit or by welding.

The second electrode arrangement 35' comprises, as seen from the inside outwards, the two counterelectrodes 351', 352', an insulating-material ring 353' and a metal ring 354', which is seated in the pocket hole 321' in the housing cap 32'.

A respective connecting line 355', 356' leads from each counterelectrode 351', 352' to a plug arrangement 357' which is arranged at the end of a tubular extension 322' of the housing cap 32' and via which the capacitors formed by the electrode 341' and the counterelectrodes 351', 352' can be connected to a measuring circuit (not shown).

The extension 322' is connected to the remaining parts of the housing cap 32' by a thinner-walled and, therefore, diaphragm-like intermediate piece 323', which ends just above the two electrode arrangements 34', 35'. By means of the intermediate piece, deflections of the extension 322' caused, for example, by vibrations acting on it from outside, are largely kept away from the electrode arrangements 34', 35'.

In operation, the pressure fluctuations mentioned produce deflections of the sensor sleeve 51 which are in a direction perpendicular to the direction of flow. These deflections are transmitted by the diaphragm 33' to the first electrode arrangement 34'. As a result, electrode 341' either moves away from the counterelectrode 351' and simultaneously approaches the counterelectrode 352' or approaches the counterelectrode 351' and simultaneously moves away from the counterelectrode 352'. However, these movements lead to changes in the capacitance of the two capacitors formed by the electrode 341' and the counterelectrode 351' and by the electrode 341' and the counterelectrode 352'.

With both variants of the invention, the effects which accelerations acting from outside on the measuring tube 2 and 2', respectively, in the form, for example, of shocks or vibrations, can have on the useful signal generated by the above capacitors are to a large extent compensated for as follows:

The mass of the sensor vane 31 and sensor sleeve 51, respectively, is greater than the mass of the first electrode arrangement 34 and 34', respectively.

Further, the geometrical moment of inertia of the sensor vane 31 and sensor sleeve 51, respectively, is made approximately equal to the geometrical moment of inertia of the first electrode arrangement 34 and 34', respectively, at the second surface of the diaphragm 33 and 33', respectively.

Finally, the housing cap 32 and 32', respectively, is dimensioned so as to be sufficiently flexurally stiff to ensure that it does not bend at a maximum permissible acceleration acting on the measuring tube 2 and 2', respectively.

This dimensioning of the geometrical moments of inertia and masses gives the following behaviour in the case of vibrations: Let it be assumed that, in FIG. 3, the sensor vane 31 and the first electrode arrangement 34 are accelerated downwards in the plane of the drawing.

Because of the greater mass of the sensor vane 31, the force acting on it is larger than the corresponding force on the electrode arrangement 34. This greater force is transmitted by the diaphragm 33 to the electrode arrangement 34 in the opposite direction; the resultant force on it is thus directed upwards, with the result that the electrode arrangement moves upwards and there results a small change in capacitance despite the vibration.

Therefore, the invention allows that torsional moments act onto the diaphragm in contrary to the EP-A 549 945 referred to; there the diaphragm is free of torsional moments.

We claim:

1. A vortex flow sensor for measuring a flow velocity and a volume flow rate of a fluid flowing in a measuring tube in one direction including, a bluff body for generating Kármán vortices which is arranged along a diameter of said measuring tube, said bluff body being connected to said measuring tube at at least one fixing location, a capacitive vortex sensing element inserted into a hole in said measuring tube downstream of said bluff body and responding to pressure fluctuations generated by said vortices, said capacitive vortex sensing element sealing off said hole in said measuring tube, the center of said hole and the center of said fixing location lying on a longitudinal axis of said measuring tube, said capacitive vortex sensing element comprising:

a diaphragm covering said hole and having a first surface facing toward said fluid and a second surface facing away from said fluid, a flexurally stiff thin sensor vane attached to said first surface of said diaphragm and being shorter than said diameter of said measuring tube, said sensor vane having flat main surfaces aligned with said axis of said measuring tube, a sleeve-shaped first electrode arrangement attached to said second surface of said diaphragm, said first electrode arrangement having at least one electrode, a housing cap surrounding said first electrode arrangement and said diaphragm, said housing cap being fixed on said measuring tube and containing a second electrode arrangement having at least one counterelectrode, the mass of said sensor vane being greater than the mass of said first electrode arrangement, the geometrical moment of inertia of said sensor vane at said first surface of said diaphragm being approximately equal to the geometrical moment of inertia of said first electrode arrangement at said second surface of said diaphragm, and said housing cap being of sufficient flexural stiffness to resist bending when a maximum permissible acceleration acts on said measuring tube.

2. A vortex flow sensor for measuring a flow velocity and a velocity and a volume flow rate of a fluid flowing in a measuring tube in one direction including, a bluff body for generating Kármán vortices which is arranged along a diameter of said measuring tube, said bluff body being connected to said measuring tube at at least one fixing location, a capacitive vortex sensing element inserted into a hole in said measuring tube downstream of said bluff body and responding to pressure fluctuations generated by said vortices, said capacitive vortex sensing element sealing off said hole in said measuring tube, the center of said hole and the center of said fixing location lying on a longitudinal axis of said measuring tube, said capacitive vortex sensing element comprising:
- a diaphragm covering said hole and having a first surface facing toward said fluid and a second surface facing away from said fluid,
- a flexurally stiff thin sensor sleeve attached to said first surface of said diaphragm and being shorter than said diameter of said measuring tube,
- a sleeve-shaped first electrode arrangement attached to said second surface of said diaphragm, said first electrode arrangement having at least one electrode,
- a housing cap surrounding said first electrode arrangement and said diaphragm, said housing cap being fixed on said measuring tube and containing a second electrode arrangement having at least one counterelectrode,
- the mass of said sensor sleeve being greater than the mass of said first electrode arrangement,
- the geometrical moment of inertia of said sensor sleeve at said first surface of said diaphragm being approximately equal to the geometrical moment of inertia of said first electrode arrangement at said second surface of said diaphragm, and
- said housing cap being of sufficient flexural stiffness to resist bending when a maximum permissible acceleration acts on said measuring tube.

* * * * *